Aug. 11, 1942.   A. B. OSGOOD   2,292,652
TRAVELING TRIPPER AND DUST COLLECTOR
Filed Feb. 20, 1941   3 Sheets-Sheet 1
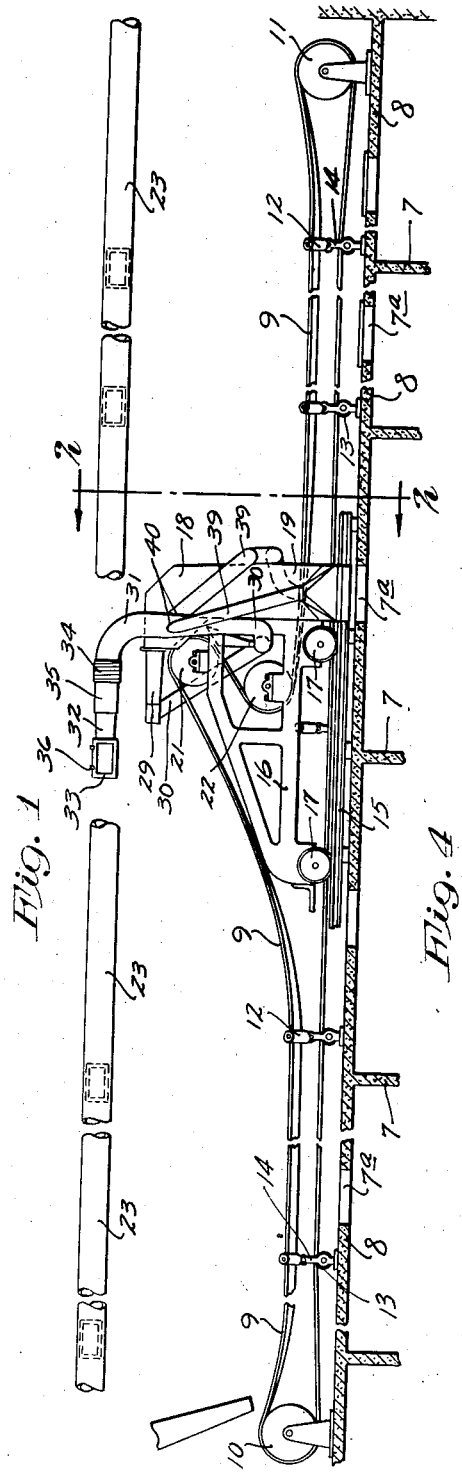
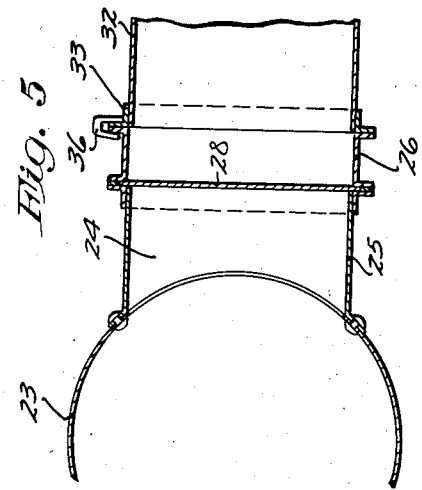
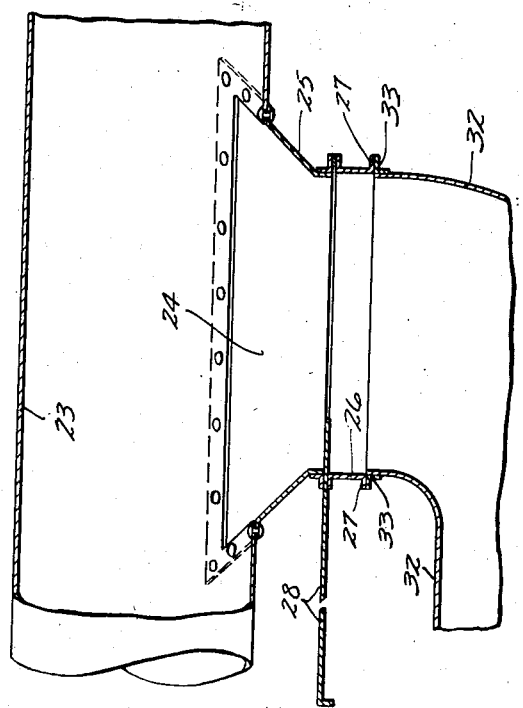
Inventor
Arthur B. Osgood
By his Attorneys
Merchant & Merchant

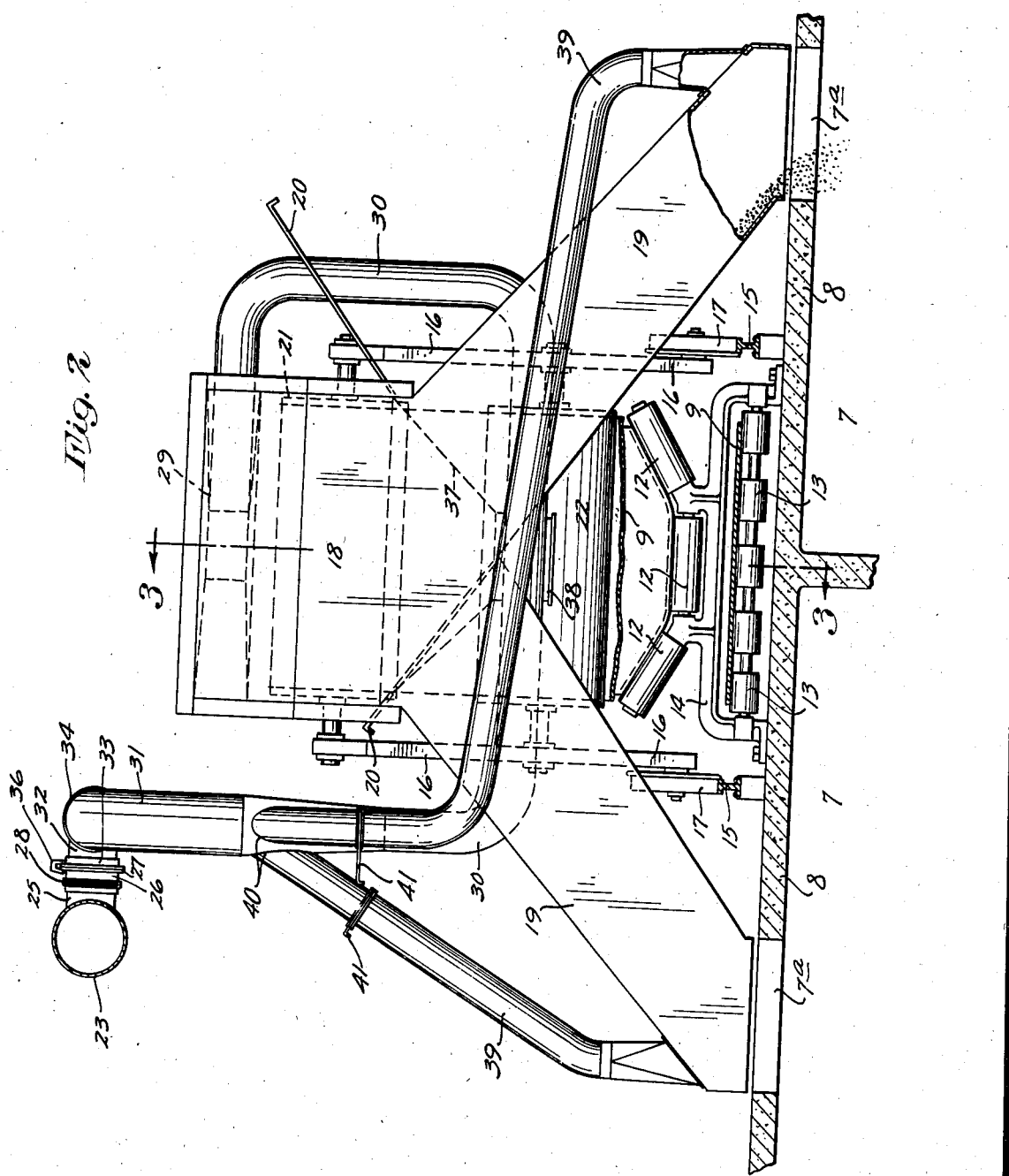

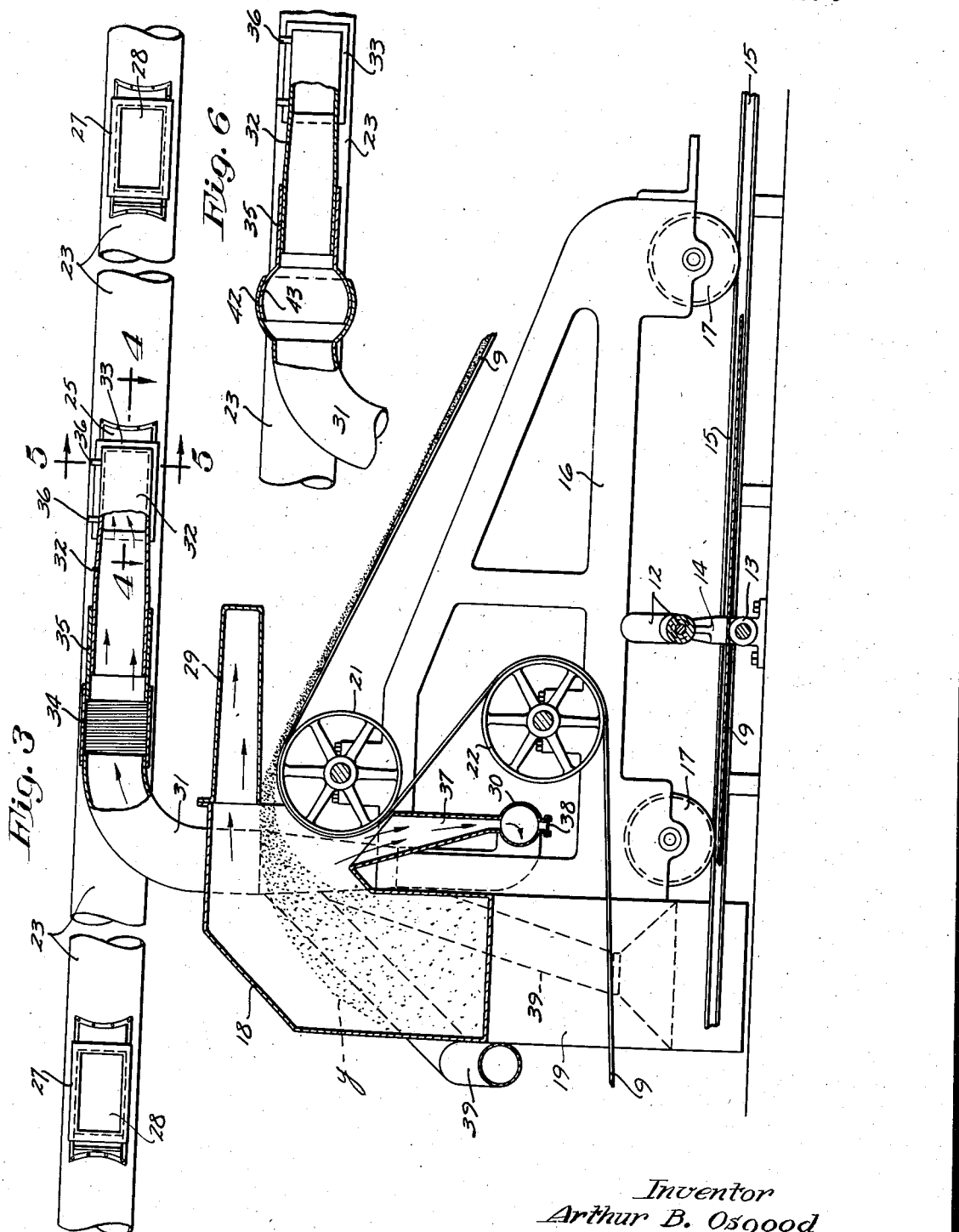

Patented Aug. 11, 1942

2,292,652

UNITED STATES PATENT OFFICE 2,292,652

TRAVELING TRIPPER AND DUST COLLECTOR

Arthur B. Osgood, Minneapolis, Minn.

Application February 20, 1941, Serial No. 379,752

1 Claim. (Cl. 209—147)

My present invention is in the nature of an improvement on or modification of the traveling tripping device and dust collector disclosed and claimed in my prior Patent No. 1,994,832 of date March 19, 1935.

In devices of this character grain is delivered to various bins under the action of the conveyor belt of a traveling tripper, and the dust from the grain is taken off or picked up at various different points and conveyed to the proper place for collection thereof.

The primary purpose of the dust collecting means is to prevent the dust from contaminating the air of the building in which the apparatus is installed. The dust that is withdrawn from the grain, if commingled in a room, is liable to become highly explosive and, moreover, is always injurious to workmen. A redelivery of part of the dust into the grain is not usually objectionable because the grain later on is usually subjected to further cleaning action.

A commercial apparatus or machine embodying the various features of the present invention is illustrated in the accompanying drawings wherein like characters indicate like parts throughout the several views.

Referring to the drawings:

Fig. 1 is a side elevation with parts broken away illustrating the invention and showing particularly the "traveling tripper" and its connection to a main suction tube that is extended along and parallel to the track on which the tripper is mounted to travel;

Fig. 2 is a transverse section taken on the line 2—2 of Fig. 1 showing the parts on a larger scale than in Fig. 1;

Fig. 3 is a vertical longitudinal section taken approximately on the line 3—3 of Fig. 2;

Fig. 4 is an enlarged horizontal section taken on the line 4—4 of Fig. 3;

Fig. 5 is an enlarged transverse section taken on the line 5—5 of Fig. 3, some parts being broken away; and Fig. 6 is a detail in section illustrating the modified form of universal or yielding joint capable of being used in the final dust delivery pipe or tube of the tripper.

The grain-receiving bins 7 will, in accordance with common practice, be located below the flooring 8 and will receive grain through ports 7a. The grain conveyor belt 9 runs over local pulleys 10 and 11 and is arranged to run along the flooring 8, usually between two rows of the receiving ports 7a. At points between the pulleys 10 and 11 the top of the belt is arranged to run over converging guide rollers 12, and the return portion of the belt is arranged to run over guide rollers 13 journaled in brackets 14 on the floor 8. For guiding the tripper, parallel rails 15 are suitably supported on the flooring 8. The tripper involves a truck body 16 having wheels 17 arranged to run on rails 15. Mounted on the truck frame 16 is a receiving hopper 18 that, for the duplex arrangement of bins, has reversely inclined or split discharge spouts 19 arranged to deliver simultaneously to two transversely spaced bin ports 7a. In the inclined bottom plates of the hopper 18 are sliding gates 20 by means of which the spouts 19 may be opened and closed at will.

Journaled to the side of the truck body 16 is an upper belt-guiding pulley 21 and a lower belt-guiding pulley 22. By reference particularly to Fig. 3 it will be seen that the conveyor belt 9 runs over the upper pulley 21 and under the lower pulley 22. Also it will be noted that the upper pulley 21 is so located that the belt 9 will be delivered into the bin 16 under the action of momentum and centrifugal force.

The structure so far described in detail may be assumed to be that or substantially that of a well known commercial installation of a machine employing the conveyor belt and traveling tripper. The conveyor belt 9 may be driven in any suitable way and, in fact, can be applied by power mechanism arranged to drive any one of the pulleys 10, 11, 21 or 22 so far as this invention is concerned. The tripper is arranged to travel along the rails so as to position the delivery spouts 19 properly over the ports 7a.

A long trunk line suction tube 23 is suitably secured along the line of travel of the traveling tripper and parallel to the track rails 15 and at its delivery end is connected to a suitable source of partial vacuum such as a fan, not shown.

At suitable intervals corresponding to the longitudinal spacing of the bin ports 7a this main suction tube 23 is provided with intake ports. These intake ports 24, preferably and as shown, are formed in laterally offset metallic shells 25, the bases of which are riveted or otherwise rigidly secured to the suction tube 23, as best shown in Figs. 3 and 4. The extreme outer portions of shells 25 are formed or provided with extension rims 26 equipped with outstanding lock flanges 27 which perform important functions presently to be noted. Working through the rims or collar-like extensions 26 are sliding gates 28 by means of which the intake ports 24 con be opened and closed at will.

The hopper 18 is closed at its top but is provided with an offset air chamber or extension 29 from which is extended a main dust suction tube 30, see particularly Figs. 2 and 3, that terminates at one side of the tripper where it is preferably enlarged and bent to form a sort of elbow 31. The elbow 31, through intermediate connections presently to be described, leads to a second or laterally bent elbow 32 which in vertical cross section is preferably made rectangular and is provided with a rigidly secured outstanding flange 33 that corresponds to the outline of the flange 27 of the rim 26 of the intake port structure 24. When the delivery end or elbow 32 is properly aligned with the particular intake port 24 of main suction tube 23, the face of the flange 33 will closely engage the face of the flange 27. It is important that the delivery elbow 32, or the part corresponding thereto, be capable of vertical and preferably also of horizontal movements in respect to the elbow 31 or corresponding end of the main dust pick-up tube 30; and this is accomplished by interposing a flexible joint between the said members 31 and 32. This flexible connection is best afforded by a flexible tube such as a spirally jointed metal tube 34, one end of which is permanently attached to the elbow 31, and the other end of which is attached to a short collar 35 that is slidably telescoped on to the end of elbow 33. The purpose of this flexible connection will presently more clearly appear.

The outstanding flange 33 at its upper portion is provided with one of more rigidly secured U-shaped hooks 36, best shown in Fig. 5, which when the elbow 32 is properly aligned with the rim 26, will engage over the flange 27 and thereby draw the faces of the two flanges 27 and 33 into closed and substantially air tight contact.

Close to the delivery portion of the belt 9, see Fig. 3, the hopper 18 is provided with a depending air spout 37 that leads directly to the main dust take-off tube 30. Tube 30, just below the lower end of air spout 37, will preferably be provided with a removable clean-out cap or door 38. Auxiliary dust take-off tubes 39, see particularly Fig. 2, lead from the lower portions of the grain delivery spouts 19 and are connected to the main dust take-off tubes 30—31 at 40, or some similar point. The tubes 39 are shown as provided with sliding gates 41 by means of which they may be opened and closed at will.

In the modified structure illustrated in Fig. 6, the flexible or yielding connection between the elbows or sections 31 and 32 are afforded by providing the sections 31 and 35 with intermeshing spherical portions 42 and 43.

*Operation*

In a general way the operation of this apparatus has been made clear, but it may be briefly summarized as follows.

When the tripper is properly moved to align its grain delivery spouts 19 with the proper bin ports 7a, the above described delivery head structure of the tripper will be either perfectly or closely aligned with the proper intake port structure of the trunk line or main air suction tube; and if the alignment is not perfect, it can be made so by the sliding slipping movement of the collar 35 on the member 32. While this alignment is being accomplished, the delivery spout should be raised and when the alignment is accomplished, it should be lowered so as to cause the hook 36 to engage the upper flange 27 of the inlet structure of the port 24. This, as noted, brings the faces of the flanges 27 and 33 into close contact. Of course, the gate 24 of the aligned intake port should be open at this time and the gates of the other intake ports will be closed.

An advantage of the above described arrangement of the coupling hook is that if the tripper should be moved accidentally or untimely while the hook is in operative position, the said hook will simply slide off from the flange 27 and no harm will be done.

Under the suction or partial vacuum produced in the main or trunk line tube 23, dust will be drawn from the various points noted, to wit, particularly from the delivery ends of the spouts 19 and from points both above and below the stream of grain indicated by dotted lines y in Fig. 3.

From the foregoing it will be evident that the flexible or yielding connection above noted is highly important and permits, without danger of breakage, quick coupling of the delivery and receiving portions of the dust delivery and conveying connections. Obviously various alterations other than those specifically illustrated herein may be made within the scope of the invention disclosed and claimed.

What I claim is:

In a machine of the kind described, a runway, a plurality of receiving bins having intake ports spaced along said runway, a main trunk line suction tube extended along said runway and provided with ports spaced to correspond to the spacing of the ports of said bins, a carriage mounted to travel on said runway and provided with a hopper having a discharge tube adapted to successively register with said bin ports, and a dust pick-up tube on said carriage extended from said hopper structure and terminating in a delivery head positioned to progressively register with the intake ports of said trunk line air tube when the delivery spout of said hopper is in registration with one of said hopper intake ports, and in which structure the intake ports of said trunk air line and the delivery ends of said dust pick-up tube are provided with interlocking flanges extended in the direction of travel of said carriage and adapted to be disengaged automatically by the traveling movement of said carriage.

ARTHUR B. OSGOOD.